US010093527B2

United States Patent
Reedy

(10) Patent No.: US 10,093,527 B2
(45) Date of Patent: Oct. 9, 2018

(54) HALF-MOON LIFTING DEVICE

(71) Applicant: Trinity Bay Equipment Holdings, LLC, Houston, TX (US)

(72) Inventor: Max Reedy, Houston, TX (US)

(73) Assignee: TRINITY BAY EQUIPMENT HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/941,606

(22) Filed: Mar. 30, 2018

(65) Prior Publication Data

US 2018/0222733 A1 Aug. 9, 2018

Related U.S. Application Data

(63) Continuation of application No. PCT/US2017/039096, filed on Jun. 23, 2017.

(60) Provisional application No. 62/355,812, filed on Jun. 28, 2016.

(51) Int. Cl.
*B66F 9/12* (2006.01)
*B66F 9/18* (2006.01)
*B65H 49/38* (2006.01)
*B66C 1/66* (2006.01)
*B21C 47/24* (2006.01)
*B65H 75/36* (2006.01)

(52) U.S. Cl.
CPC .............. *B66F 9/18* (2013.01); *B21C 47/24* (2013.01); *B65H 49/38* (2013.01); *B65H 75/366* (2013.01); *B66C 1/66* (2013.01)

(58) Field of Classification Search
CPC ............ B66F 9/18; B21C 47/24; B65H 49/38; B65H 75/366; B66C 1/66
See application file for complete search history.

(56) References Cited

U.S. PATENT DOCUMENTS

| 1,723,320 | A | * | 8/1929 | Zibelman | B62D 43/02 180/313 |
|---|---|---|---|---|---|
| 2,434,140 | A | * | 1/1948 | Bernstein | A62C 33/04 248/89 |
| 2,827,189 | A | * | 3/1958 | Knudstrup | B66F 9/187 414/607 |
| 3,409,156 | A | | 11/1968 | Mills | |
| 3,511,400 | A | * | 5/1970 | Oswald | B65D 19/44 244/137.4 |
| 3,690,492 | A | | 9/1972 | Shore | |

(Continued)

OTHER PUBLICATIONS

International Search Report and Written Opinion dated Sep. 13, 2017 for Application No. PCT/US2017/039096 filed Jun. 23, 2017 for Half-Moon Lifting Device.

*Primary Examiner* — Michael A Riegelman
(74) *Attorney, Agent, or Firm* — Greenberg Traurig, LLP

(57) ABSTRACT

Nonlimiting embodiments including methods and apparatus are provided for moving coils of flexible pipe. A pipe coil lifting device comprises a superstructure having a pair of longitudinal channels attached to and forming sides of an outermost portion of the superstructure, a longitudinal central member extending between the channel portions, the superstructure having at least one cross-member perpendicular and attached to the central member and channel portions, and wherein the top of the superstructure forms a convex upper surface attached to the channel portions, central member and cross-members.

19 Claims, 7 Drawing Sheets

(56) References Cited

U.S. PATENT DOCUMENTS

| | | | | |
|---|---|---|---|---|
| 3,768,852 A | * | 10/1973 | Back | B66C 1/12 |
| | | | | 294/74 |
| 3,830,388 A | * | 8/1974 | Mott | B60B 29/002 |
| | | | | 414/427 |
| 4,015,739 A | * | 4/1977 | Cox | A01D 87/0069 |
| | | | | 414/684 |
| 4,026,495 A | * | 5/1977 | Bartelt | B21C 47/003 |
| | | | | 242/129.62 |
| 4,365,768 A | * | 12/1982 | Woodruff | B65H 49/26 |
| | | | | 242/156.2 |
| 4,793,801 A | * | 12/1988 | Roman | C21D 9/54 |
| | | | | 242/575.5 |
| 4,929,145 A | | 5/1990 | Thompson | |
| 6,419,424 B1 | * | 7/2002 | Null | B65H 49/24 |
| | | | | 242/557 |
| 6,840,731 B2 | * | 1/2005 | Figiel | B66C 1/485 |
| | | | | 414/426 |
| 9,120,636 B2 | * | 9/2015 | Cavirani | B65H 19/12 |
| 2014/0193235 A1 | * | 7/2014 | Kennedy | B66F 9/187 |
| | | | | 414/812 |

* cited by examiner

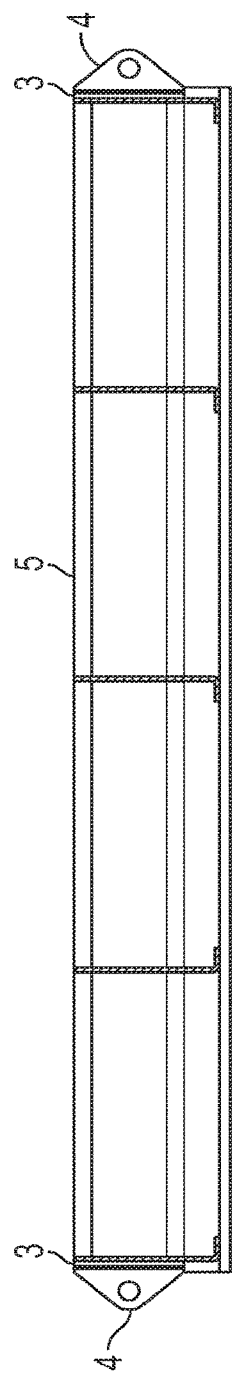
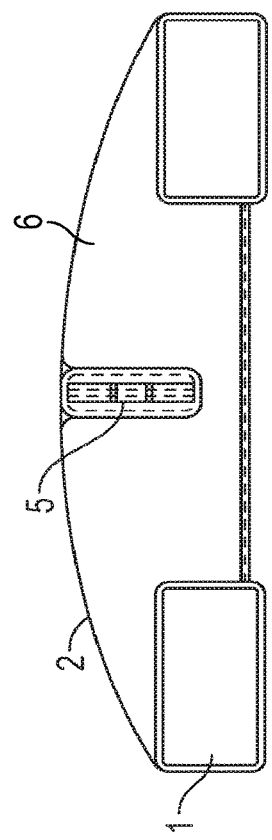
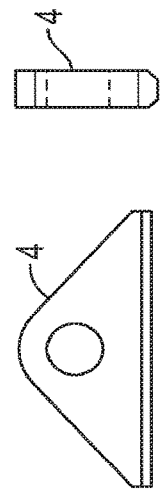
FIG. 7
FIG. 8
FIG. 9

HALF-MOON LIFTING DEVICE

CROSS-REFERENCE TO RELATED APPLICATIONS

This application is a continuation of PCT International Patent Application No. PCT/US17/39096 filed Jun. 23, 2017, which claims the benefit, and priority benefit, of U.S. Provisional 62/355,812 filed Jun. 28, 2016, the disclosures of which are incorporated by reference herein in their entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

Various nonlimiting embodiments provide methods and apparatus for moving coils of flexible pipe. A pipe coil lifting device comprises a superstructure having a pair of longitudinal channels attached to and forming sides of an outermost portion of the superstructure, a longitudinal central member extending between the channel portions, the superstructure having at least one cross-member perpendicular and attached to the central member and channel portions, and wherein the top of the superstructure forms a convex upper surface attached to the channel portions, central member and cross-members.

In other nonlimiting embodiments, a pipe coil lifting device comprises a superstructure having a pair of longitudinal channel portions attached to and forming sides of an outermost portion of the superstructure, a longitudinal central member extending between the channel portions having at least one cross-member perpendicular and attached to the central member and channel portions, and wherein the top of the superstructure forms a convex upper surface attached to the channel portions, central member and cross-members.

In further nonlimiting embodiments, a method for lifting a pipe coil comprises lifting a coil of flexible pipe with a pipe coil lifting device that has a superstructure with a central member and at least one cross-member perpendicular to the central member, with two channels at the outside long-edges of the superstructure, with a convex surface attached to the cross-members of the superstructure.

BRIEF DESCRIPTION OF THE DRAWINGS

A better understanding of the present invention can be obtained when the following detailed description of the preferred embodiment is considered in conjunction with the following drawings, in which:

FIG. 7 illustrates a cross-sectional view of a pipe coil lifting device according to embodiments of the present disclosure;

FIG. 8 illustrates a cross-sectional view of a pipe coil lifting device according to embodiments of the present disclosure;

FIG. 9 illustrates an end member for a pipe coil lifting device according to embodiments of the present disclosure;

DETAILED DESCRIPTION

Embodiments of the present disclosure relate generally to a pipe coil device for use in transporting and/or deploying coils of pipe using a fork lift or a crane. Coils of pipe may be self supported, for example, using bands to hold coils together, or coils of pipe may be supported around a reel (which may be referred to as a reel of pipe). Coil lifting devices according to embodiments of the present disclosure for use lifting coils held together with using bands or straps may include a superstructure with a central longitudinal member and one or more cross-members, with two channels at the outside long-edges of the superstructure attached to the cross-members, with a convex upper surface attached to the cross-members of the superstructure.

Embodiments of the present disclosure will be described below with reference to the figures. In one aspect, embodiments disclosed herein relate to embodiments for a Half-Moon Lifting Device configured to transport coils of flexible pipe.

Figure 1:
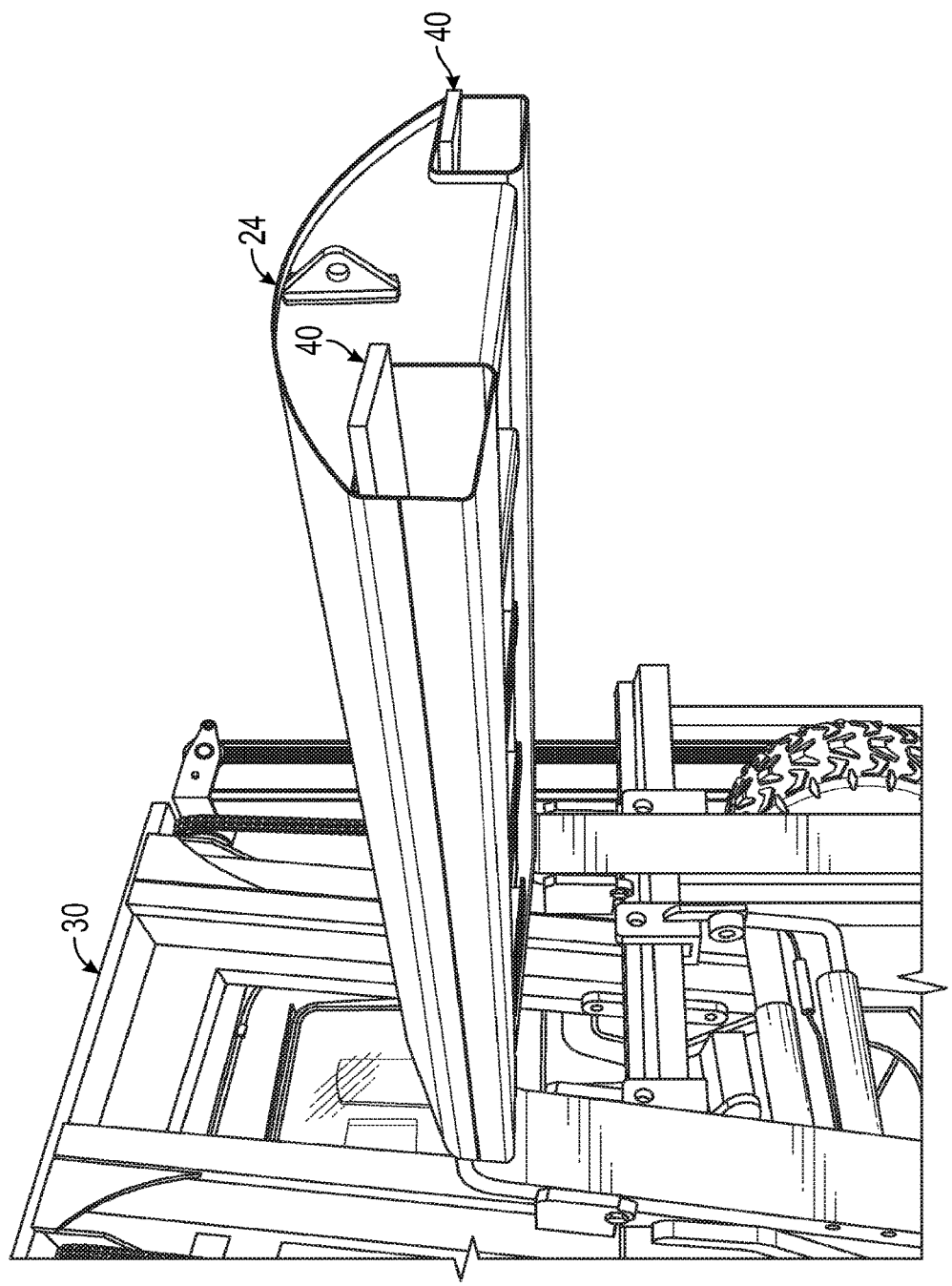
FIG. 1 is a diagram of a pipe coil lifting device mounted on tines of a fork lift according to embodiments of the present disclosure.

FIG. 1 shows a diagram of a Half-Moon Lifting Device 24 disposed on the tines 40 of a fork lift 30 according to embodiments of the present disclosure. A fork lift may be equipped with a hydraulic side-shift function for moving or adjusting the forks or tines.

Figure 2:
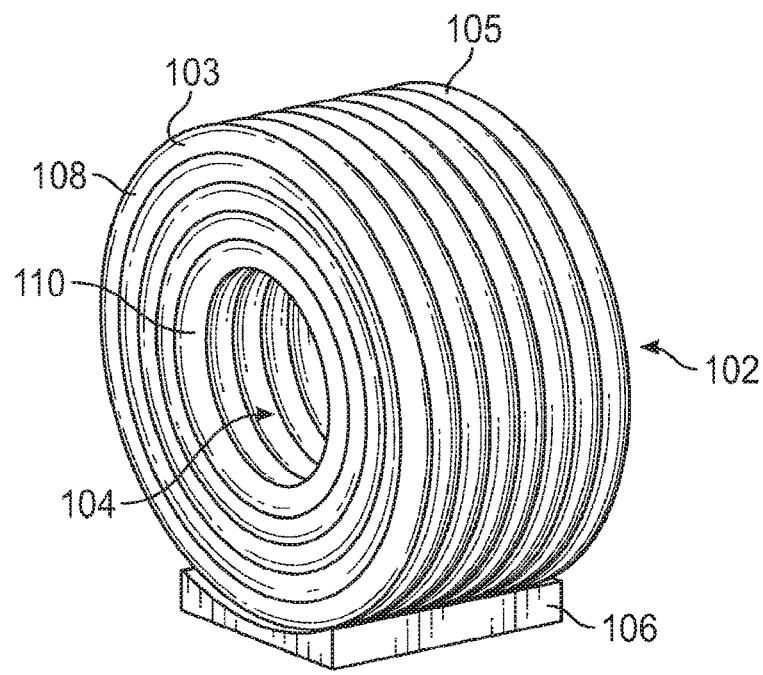
FIG. 2 is a diagram of a coil of pipe according to embodiments of the present disclosure.
Figure 3:
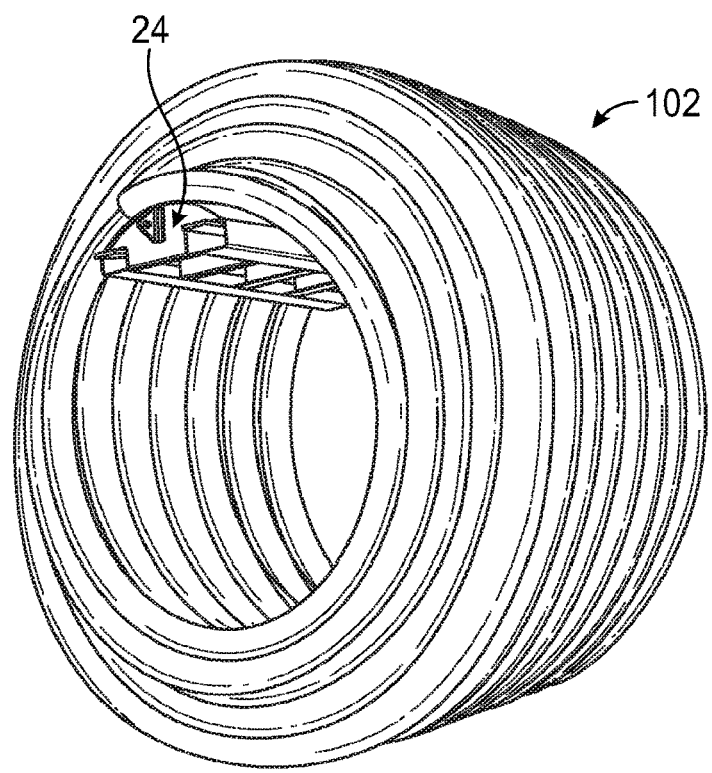
FIG. 3 is a diagram of a coil of pipe lifted disposed on a pipe coil lifting device using a fork lift according to embodiments of the present disclosure.

Coil of pipe 102 may be formed by wrapping pipe into a coil with an interior channel 104 formed axially therethrough, where the coil of pipe 102 may be moved as a single package or bundle of coiled pipe, as shown in FIG. 2. In FIG. 3 a coil of pipe 102 is illustrated disposed on a Half-Moon Lifting Device 24. Each complete turn of coiled pipe may be referred to as a wrap of pipe. Multiple wraps of pipe in a coil of pipe may be configured in columns along an axial dimension of the coil of pipe and/or configured in layers along a radial dimension of the coil of pipe. For example, multiple columns of wraps may be formed along an axial direction of the coil of pipe, where the axial dimension of the coil of pipe is based on the diameter of the pipe and the number and axial position of wraps forming the coil of pipe 102. Further, multiple layers of wraps may be formed along a radial direction of the coil of pipe, where the radial dimension of the coil of pipe is based on the diameter of the pipe and the number and radial position of the wraps forming the coil of pipe.

As shown in FIG. 2, coil of pipe 102 may be one or more layers (e.g., layers 108 and 110) of pipe packaged or bundled into a larger coil. Coil of pipe 102 may include at least one or more layers of pipe that has been coiled into a particular shape or arrangement. As shown in FIG. 2, coil of pipe 102 is coiled into a substantially cylindrical shape having substantially circular bases 103 and 105 formed on each end of coil of pipe 102, where the axial dimension of coil of pipe 102 is measured between the two bases 103, 105. In addition, the coil of pipe may be attached to a pipe coil skid 106.

A pipe, as understood by those of ordinary skill, may be a tube to convey or transfer any water, gas, oil, or any type of fluid known to those skilled in the art. The pipe used to make up coil of pipe 102 may be made of any type of materials including without limitation plastics, metals, a combination thereof, composites (e.g., fiber reinforced composites), or other materials known in the art.

In one or more embodiments, the pipe used to make up coil of pipe 102 may be a flexible type of pipe. Flexible pipe is used frequently in many applications, including without limitation, both onshore and offshore oil and gas applications. Flexible pipe may include Flexible Composite Pipe (FCP) or Reinforced Thermoplastic Pipe (RTP). A FCP/RTP pipe may itself be generally composed of several layers. In one or more embodiments, a flexible pipe may include a high-density polyethylene ("HDPE") pipe having a reinforcement layer and an HDPE outer cover layer. Additionally, various types of polyethylene are available for flexible pipe composition. Other polymers may also be used such as nylon, PVDF, Polypropylene and many others. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel reinforced layer, helically wound steel strips may be placed over a liner made of thermoplastic pipe. Flexible pipe may be designed to handle a variety of pressures. Further, flexible pipe may offer unique features and benefits versus steel/carbon steel pipe lines in the area of corrosion resistance, flexibility, installation speed and re-usability.

Coils of pipe may be made with coil having an outer diameter ranging, for example, from about 2 inches (5.1 cm) to about 10 inches (25.4 cm). However, pipe having other dimensions may be coiled to form a coil of pipe and loaded for transportation according to embodiments of the present disclosure. Accordingly, pipe that that may be spooled or coiled into coil of pipe 102 may be made to suit a number of dimensions and may have any diameter useful to a particular project.

As known to those of ordinary skill in the art, pipe used to make up coil of pipe 102 may be coiled using spoolers or other coiler machines suited for such a function. Those of ordinary skill will recognize that the present disclosure is not limited to any particular form of coiler or other device that may be used to form pipe into a coil. Coiling pipe into a coil of pipe, such as 102, assists when transporting pipe, which may be several hundred feet in length in one or more embodiments. Further, coil of pipe 102 may be assembled as a coil to facilitate deployment of the coil. Deployment, as described above and used herein, may refer to the action of unspooling or unwinding the pipe from coil of pipe 102.

After being assembled into a coil, coil of pipe 102 may include an interior channel 104 formed axially through the coil of pipe 102. Interior channel 104 is a bore disposed generally in the center of coil of pipe 102. Interior channel 104 is substantially circular shaped. The coil of pipe 102 may have an outer diameter (OD) and an inner diameter (ID), where the inner diameter is defined by the interior channel.

In one or more embodiments, coil of pipe 102 may have an outer diameter ranging from about 60 inches (1.5 m), which may occur, for example, when coil of pipe 102 has at least two layers of 2 inch pipe, to about 192 inches (4.9 m). In one or more embodiments, a coil of pipe may have an inner diameter ranging, for example, from about 84 inches (2.1 m) to about 126 inches (3.2 m). Further, in one or more embodiments, a coil of pipe may have an axial dimension (width) ranging from about 5 inches (12.7 cm) to about 92 inches (2.3 m). However, these are merely exemplary measurements. Those of ordinary skill in the art will appreciate that any range of dimensions (inner and outer diameters and width) may be accommodated using one or more embodiments.

Skid 106 illustrated in FIG. 2 may be a platform upon which coil of pipe 102 may be disposed to hold the coil of pipe 102 in a vertical orientation. In one or more embodiments, coil of pipe 102 may be loaded and unloaded for transportation while remaining on skid 106.

Figure 4:
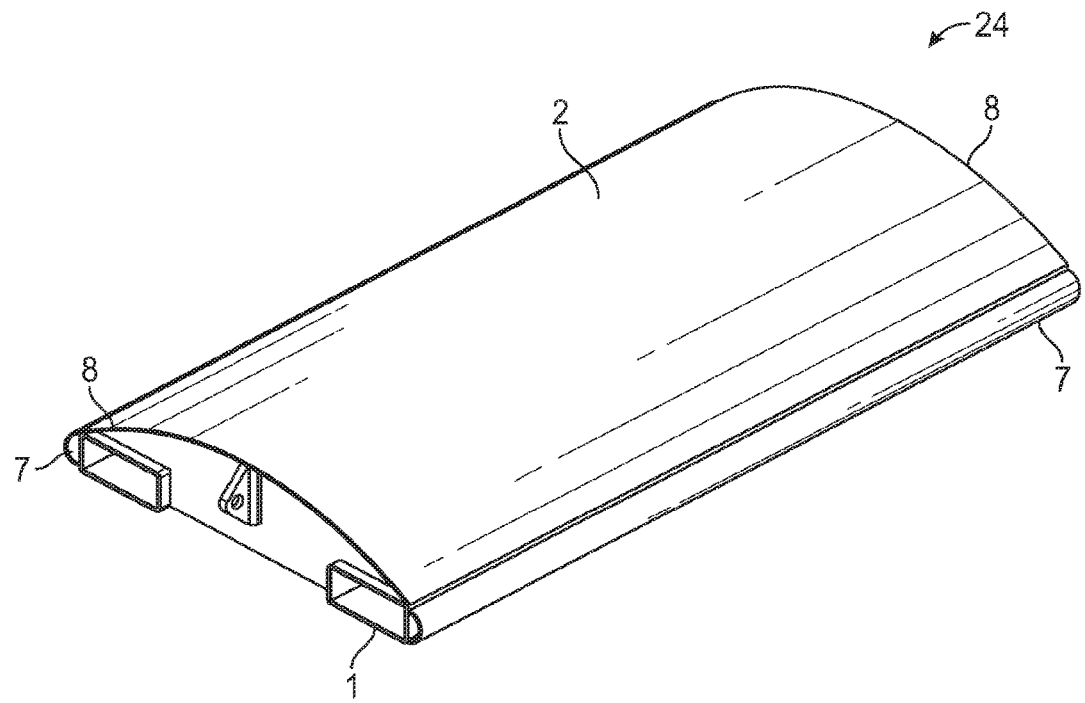
FIG. 4 illustrates a top view of a pipe coil lifting device according to embodiments of the present disclosure.

Now turning to FIG. 4 various illustrative embodiments of a pipe coil lifting device 24 (Half-Moon Lifting Device') are illustrated. The device is used to access the interior diameter of a coil of pipe 102, and used with a forklift to carry and move the pipe. Various aspects of a lifting device 24 suitable for moving a coil of pipe with a wide range of diameters are illustrated in FIGS. 4 to 16. It should be noted that various sizes of lifting devices are suitable for moving a coil of pipe.

Figure 5:
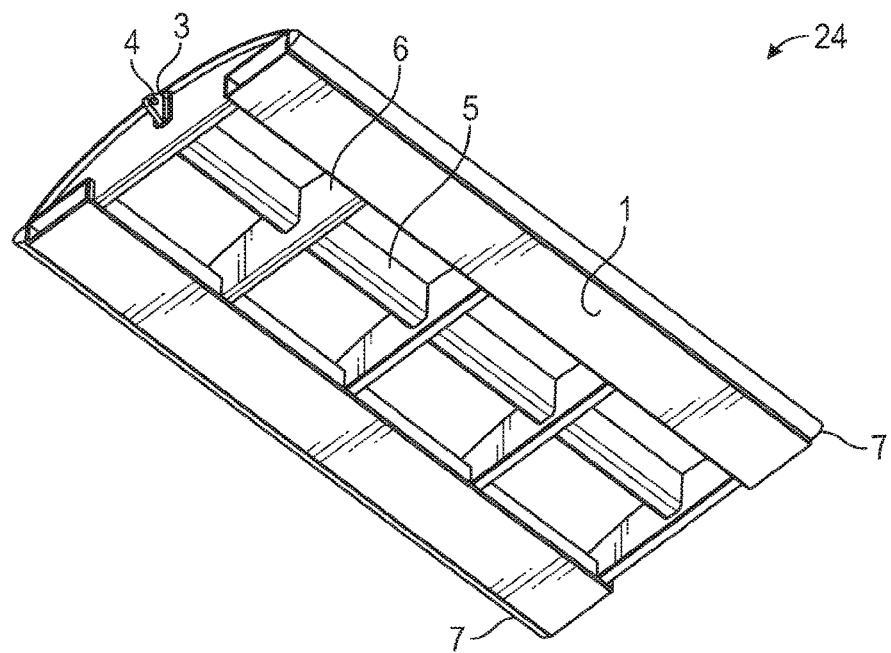
FIG. 5 illustrates a view from under a pipe coil lifting device according to embodiments of the present disclosure.
Figure 14:
FIG. 14 illustrates a cross sectional view of the upper surface of a pipe coil lifting device according to embodiments of the present disclosure.

As illustrated in FIG. 5, the device has a superstructure including a pair of channels (or channel portions) 1, the channels or channel portions accommodating forks or tines of a forklift. In addition the channels may accommodate means for securing the lifting device to the tines of a fork lift. An upper surface 2 of the device 24, may be arched to attach to the top of cross-members 6, of which there may be one or more, for example five cross-members 6 as illustrated in FIG. 5. The upper surface 2 may overlap onto the outside surface of the channels 1 (see also FIG. 14 illustrating overlap portion to attach to channel). This overlap of surface 2 onto channels 1 as well as surface 2 attached to cross-member 6 helps provide stiffness to the lifting device 24. Device member 3, of which there may be two for the device, (see also FIG. 10). End member 4 as illustrated, of which there may be two on either end of device 24, (see also FIG.

9) is suitable for attaching the device to cables for use with a crane. Device member 3 and end member 4 are attached to a longitudinal central member 5. Cross-members 6, illustrated in FIG. 8 and FIG. 12, of which there may be one or more, has an upper edge that meets upper surface 2. A half-pipe 7, for example a schedule 40 pipe split lengthwise, may be attached to the outer surfaces of channels 1 to provide protection to the interior surfaces of coiled pipe so as to protect the pipe material from angled surfaces on the lifting device 24 (see also FIG. 16). Likewise, on one or either end of upper surface 2, a round bar 8, for example a ¼ inch or similar appropriate size, may be attached along the arcuate edge that will also provide sharp-edge protection to the pipe material to be moved with the lifting device 24 and is further illustrated in FIG. 15.

In certain illustrative embodiments, lifting device 24 can be formed of steel or other metal material. In certain illustrative embodiments the lifting devices are capable of a 20 ton rating, or for a rated load of 40,000 lbs.

Figure 6:
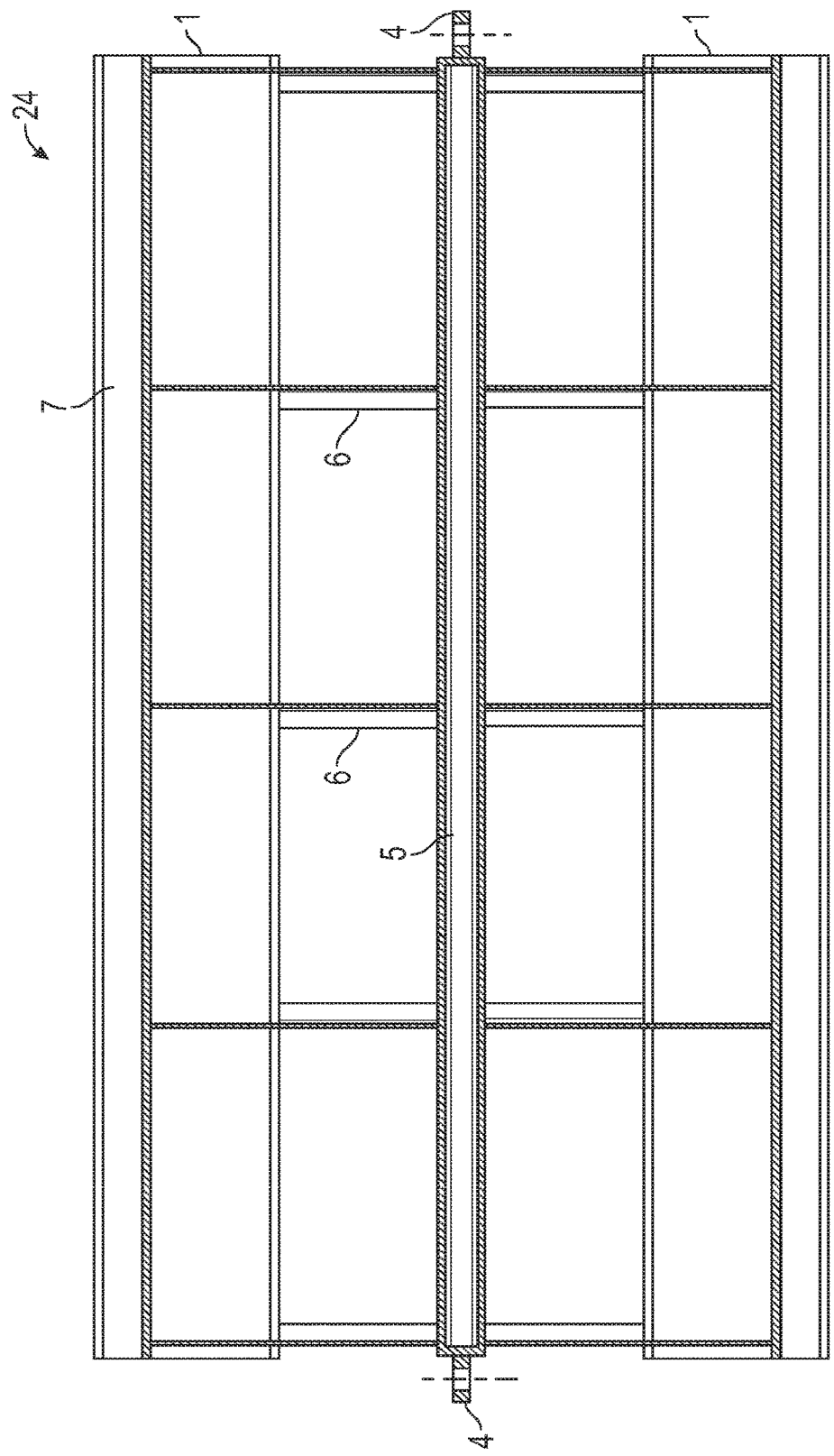
FIG. 6 illustrates a cross-sectional view a pipe coil lifting device according to embodiments of the present disclosure.
Figure 10:
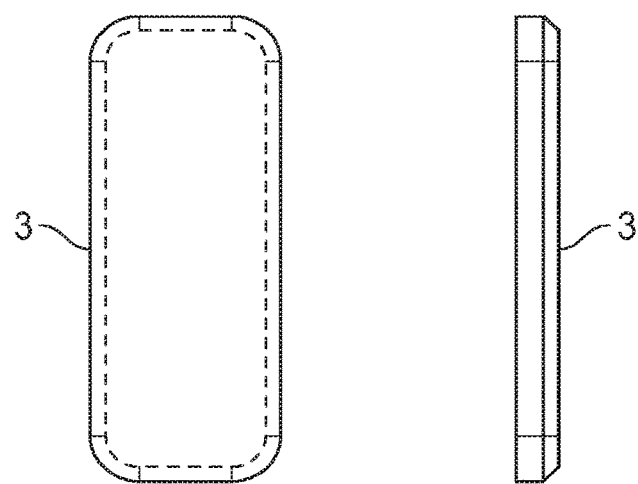
FIG. 10 illustrates a device member for a pipe coil lifting device according to embodiments of the present disclosure.
Figure 11:
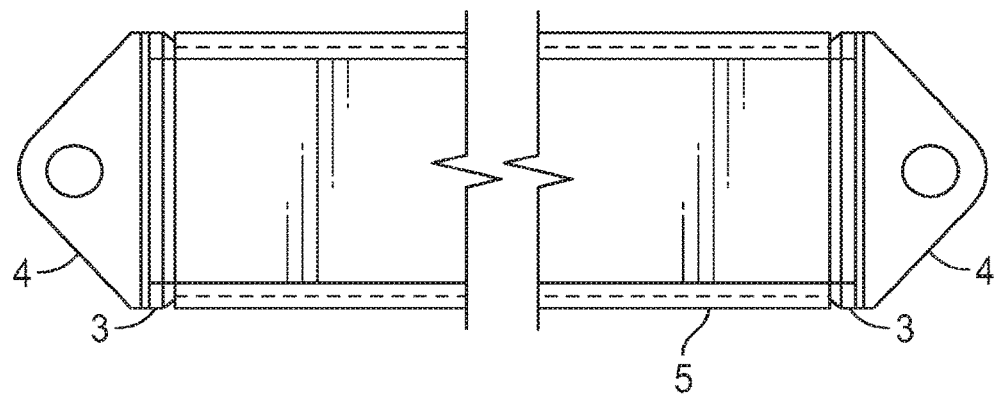
FIG. 11 illustrates the positions of an end-member attached to device-member that is attached to a central member according to embodiments of the present disclosure.
Figure 12:
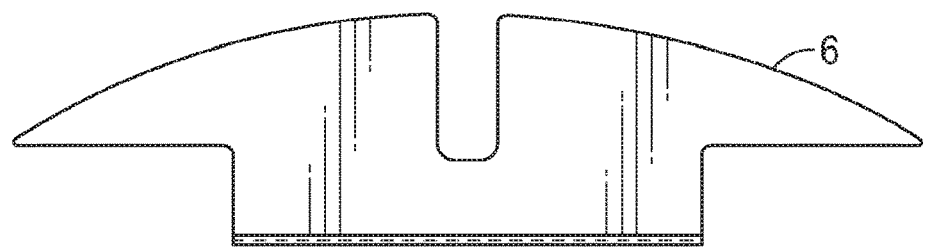
FIG. 12 illustrates a cross-member for a pipe coil lifting device according to embodiments of the present disclosure.
Figure 13:
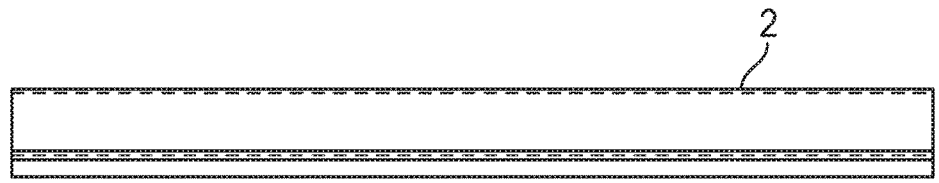
FIG. 13 illustrates an upper surface of a pipe coil lifting device according to embodiments of the present disclosure.

Lifting device 24 supporting various diameter coils, is illustrated in cross-section with FIG. 6. FIG. 7 illustrates another cross-sectional view with examples of several distances of the cross-members 6. FIG. 8 illustrates still another cross-sectional view through lifting device 24 showing cross member 6, central member 5 and channels 1. FIG. 9 illustrates two views of end-member 4. FIG. 30 illustrates further detail of device member 3. FIG. 11 illustrates the positions of end-member 4 attached to device-member 3 shown attached to central member 5. FIG. 12 illustrates a cross-member 6. FIG. 13 illustrates a side view of upper surface 2. FIG. 14 is cross section of upper surface 2.

Figure 15:
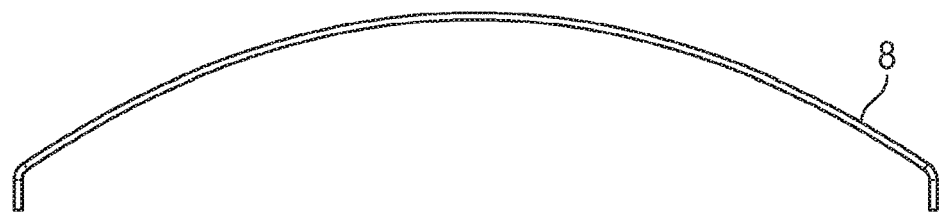
FIG. 15 illustrates the position of a bar at the end of the upper surface of a pipe coil lifting device according to embodiments of the present disclosure.
Figure 16:
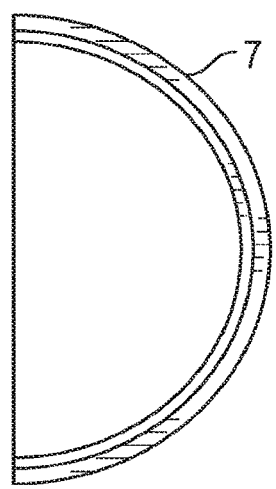
FIG. 16 illustrates the half pipe attached to the channel for a pipe coil lifting device according to embodiments of the present disclosure.

FIG. 15 illustrates the round bar 8 may be attached along the arcuate edge and may extend at least partially over channels 1. FIG. 16 illustrates half-pipe 7, which may be a schedule 40 pipe (for example split in two pieces along the central axis) for attachment to the channel 1 or the channel 1 and the overlap portion of upper surface 2.

In general a lifting device 24 is capable of use with various diameter coils without damaging the outside surfaces of the coils of pipe contacted by the long-sides of the lifting device 24 during movement by a forklift.

In one nonlimiting embodiment a pipe coil lifting device comprises a superstructure with a central longitudinal member and at least one cross-member, with two channels at the outside long-edges of the superstructure attached to the cross-members, and a convex upper surface is attached to the cross-members of the superstructure.

In other aspects, the pipe coil lifting device upper surface is attached to and overlaps upon the outside surface of the channels. Further, the pipe coil lifting device may have a device member attached to the central member and an end member attached to the central member. The central longitudinal member may extend beyond the upper surface and comprise an end member suitable for attaching cable fittings. Half-pipes may be attached to the lateral outside surfaces of the channels. A ¼ inch round bar may be attached to the arcuate edge of the convex upper surface.

In another nonlimiting embodiment, a pipe coil lifting device comprises a superstructure having a pair of longitudinal channel portions attached to and forming sides of an outermost portion of the superstructure. A longitudinal central member extends between the channel portions with the superstructure having at least one cross-member perpendicular and attached to the central member and channel portions. The top of the superstructure forms a convex upper surface attached to the channel portions, central member and cross-members.

In other aspects, the upper surface of the pipe coil lifting device overlaps upon the outside surface of the channel portions. A device member may be attached to the central member and an end member attached to the central member. The longitudinal central member may extend beyond the upper surface and comprise an end member for attaching cable fittings. Half-pipes may be attached to the lateral outside surfaces of the channel portions. A ¼ inch round bar attached to the arcuate edge of the convex upper surface.

In still another nonlimiting embodiment, a method is provided for lifting a pipe coil the method comprising lifting a coil of flexible pipe with a pipe coil lifting device disposed on a forklift, the pipe coil lifting device comprising a superstructure with a central member and at least one cross-member perpendicular to the cross member, with two channels at the outside long-edges of the superstructure, with a convex surface attached to the cross-members of the superstructure. When using the lifting device with a fork lift, a hydraulic side-shift function of the fork lift may be used to secure the lifting device to the tines of the fork lift. Alternatively, the lifting device may be attached for moving a pipe coil with a crane using a cable or chain attached to end members of the central member of the device.

While the present disclosure has been described with respect to a limited number of embodiments, for example lifting devices for coils with inside diameters of seven and nine feet, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe coil lifting device comprising: a superstructure with a central longitudinal member and at least one cross-member, with two channels at the outside long-edges of the superstructure attached to the cross-members, with a convex upper surface attached to the cross-members of the superstructure.

2. The pipe coil lifting device of claim 1 wherein the upper surface is attached to and overlaps upon the outside surface of the channels.

3. The pipe coil lifting device of claim 1 further comprising a device member attached to the central member and an end member attached to the central member.

4. The pipe coil lifting device of claim 1 wherein the central longitudinal member extends beyond the upper surface and comprises an end member for attaching cable fittings.

5. The pipe coil lifting device of claim 1 further comprising half-pipes attached to the lateral outside surfaces of the channels.

6. The pipe coil lifting device of claim 1 further comprising a ¼ inch round bar attached to the arcuate edge of the convex upper surface.

7. A pipe coil lifting device comprising: a superstructure having a pair of longitudinal channel portions attached to and forming sides of an outermost portion of the superstructure, a longitudinal central member extending between the channel portions having at least one cross-member perpendicular and attached to the central member and channel portions, and wherein the top of the superstructure forms a convex upper surface attached to the channel portions, central member and cross-members.

8. The pipe coil lifting device of claim 7 wherein the upper surface overlaps upon the outside surface of the channel portions.

9. The pipe coil lifting device of claim 7 further comprising a device member attached to the central member and an end member attached to the central member.

10. The pipe coil lifting device of claim 7 wherein the longitudinal central member extends beyond the upper surface and comprises an end member for attaching cable fittings.

11. The pipe coil lifting device of claim 7 further comprising half-pipes attached to the lateral outside surfaces of the channel portions.

12. The pipe coil lifting device of claim 7 further comprising a round bar attached to the arcuate edge of the convex upper surface.

13. A method for lifting a pipe coil comprising: lifting a coil of flexible pipe with a pipe coil lifting device, the pipe coil lifting device comprising a superstructure with a central member and at least one cross-member perpendicular to the central member, with two channels at the outside long-edges of the superstructure, with a convex surface attached to the cross-members of the superstructure.

14. The pipe coil lifting device of claim 13 further comprising a device member attached to the central member and an end member attached to the central member.

15. The method of claim 14 wherein the pipe coil lifting device is attached by a cable to the end member.

16. The method of claim 15 wherein the pipe coil lifting device is attached by a cable to a crane for moving a pipe coil.

17. The method of claim 13 wherein the pipe coil lifting device is mounted on a fork lift.

18. The method of claim 17 wherein the pipe coil lifting device is secured to the channels of the fork lift by hydraulic force applied to the fork lift tines.

19. The method of claim 13 wherein the pipe coil lifting device is secured with a cable to the pipe coil lifting device.

* * * * *